(12) United States Patent
Min et al.

(10) Patent No.: US 9,405,452 B2
(45) Date of Patent: Aug. 2, 2016

(54) APPARATUS AND METHOD OF SEARCHING FOR CONTENTS IN TOUCH SCREEN DEVICE

(75) Inventors: Jung-ki Min, Ansan-si (KR); Jong-won Jin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 343 days.

(21) Appl. No.: 12/911,792

(22) Filed: Oct. 26, 2010

(65) Prior Publication Data

US 2011/0154235 A1 Jun. 23, 2011

(30) Foreign Application Priority Data

Dec. 21, 2009 (KR) .................. 10-2009-0128341

(51) Int. Cl.
*G06F 3/033* (2013.01)
*G06F 3/0485* (2013.01)
*G06F 3/0482* (2013.01)
*G06F 3/0488* (2013.01)

(52) U.S. Cl.
CPC ............ *G06F 3/0485* (2013.01); *G06F 3/0482* (2013.01); *G06F 3/04883* (2013.01)

(58) Field of Classification Search
None
See application file for complete search history.

(56) References Cited

U.S. PATENT DOCUMENTS 7,636,898 B2 * 12/2009 Takahashi ................. 715/769
2006/0036568 A1 * 2/2006 Moore et al. ............... 707/1
2006/0242121 A1 * 10/2006 DeVorchik et al. ........ 707/3
2006/0242122 A1 * 10/2006 DeVorchik et al. ........ 707/3
2006/0242164 A1 * 10/2006 Evans et al. ............. 707/100
2007/0198561 A1 * 8/2007 Lee et al. ................ 707/101
2008/0155428 A1 * 6/2008 Lee ......................... 715/745
2009/0070711 A1 * 3/2009 Kwak et al. .............. 715/829
2009/0128500 A1 * 5/2009 Sinclair ................... 345/173
2009/0163250 A1 * 6/2009 Park ........................ 455/566
2009/0193351 A1 * 7/2009 Lee et al. ................. 715/769
2009/0210824 A1 * 8/2009 Kawamura ............... 715/828
2009/0228832 A1 * 9/2009 Cheng .................... 715/810
2009/0282360 A1 * 11/2009 Park et al. ............... 715/786
2010/0146451 A1 * 6/2010 Jun-Dong et al. ........ 715/841
2012/0246207 A1 * 9/2012 Evans et al. ............. 707/829
2014/0189591 A1 7/2014 Park et al.

FOREIGN PATENT DOCUMENTS

KR 10-2009-0039207 A 4/2009
KR 1020090116971 A 11/2009

OTHER PUBLICATIONS

DHTML eXtensions-professional AJAX components for advanced web UI, Published Apr. 26 and Apr. 30 , 2009 by DHTMLX LTD. pp. 1-12.*
Communication dated Feb. 3, 2016, issued by the Korean Intellectual Property Office in counterpart Korean Application No. 10-2009-0128341.

* cited by examiner

*Primary Examiner* — Hien Duong
(74) *Attorney, Agent, or Firm* — Sughrue Mion, PLLC (57) ABSTRACT

A method of searching for content in a touch screen device includes: receiving selection signals of first content and second content; extracting contents existing between the first content and the second content, and displaying two or more representative contents, the number of which corresponds to the number of contents that may be simultaneously displayed on a screen, among the extracted contents; and repeating the above processes by using the displayed two or more representative contents.

15 Claims, 7 Drawing Sheets

APPARATUS AND METHOD OF SEARCHING FOR CONTENTS IN TOUCH SCREEN DEVICE

CROSS-REFERENCE TO RELATED PATENT APPLICATION

This application claims the benefit of Korean Patent Application No. 10-2009-0128341, filed on Dec. 21, 2009 in the Korean Intellectual Property Office, the disclosure of which is incorporated herein in its entirety by reference.

BACKGROUND

1. Field

The exemplary embodiments relate to an apparatus and method of searching for contents in a touch screen, and more particularly, to an apparatus and method of hierarchically searching for contents in a touch screen-based device.

2. Description of the Related Art

Recently, touch screen-based devices such as mobile phones, smart phones, personal digital assistants (PDAs), portable multimedia players (PDPs), digital cameras, and camcorders have become widely distributed.

Touch screen-based devices may reduce the number of input operations compared to conventional keypad-based devices. The touch screen-based devices store a large number of contents used by users, and output menus, operating states, and data relating to the contents as figures, characters, and videos. For example, contents may include photos, music, messages, phone numbers, and memos.

Thus, the above touch screen-based devices require a solution to enable efficient searching of a large number of contents.

SUMMARY

The exemplary embodiments provide an apparatus and method of searching for contents in a touch screen device, which searches for contents hierarchically by using touch and drag operations.

According to an aspect of an exemplary embodiment, there is provided a method of searching for content in a touch screen device, the method including: receiving selection signals of first content and second content; and extracting contents existing between the first content and the second content, and displaying N number of representative contents, where N is a number which corresponds to a number of contents that may be simultaneously displayed on a screen, among the extracted contents.

The first content and the second content may be representative contents, respectively.

When a selection signal of only the first content is input, contents between the first content and the second content may be sequentially displayed.

The signal for selecting only the first content may be sensed as a drag operation in a uni-direction on a first content section of the touch screen.

The representative contents may be set by dividing all of the contents of the touch screen device by the number of contents that may be simultaneously displayed on one screen, or set by a user of the touch screen device.

The first and second content selection signals may be generated by a drag and drop operation on the touch screen.

The method may further include displaying upper level contents of the first content or lower level contents of the first content according to a direction of a drag operation performed on the displayed first content.

When a drag operation from right to left on the displayed first content of the screen is sensed, the upper level contents of a first representative content may be displayed with reference to history information.

When a drag operation from left to right on a first content section of the screen is sensed, lower level contents of the first representative content may be sequentially displayed.

When no lower level content of the first content exists, a first content section may be sequentially searched by touching operation.

The method may further include displaying representative contents of an upper level of the displayed contents with reference to history information, when a drag operation from left to right on any section of the screen is sensed.

According to an aspect of another exemplary embodiment, there is provided a touch screen device including: a display unit which displays contents on a screen; and a touch panel sensing at least one of a touch operation and a drag operation for selecting the contents, wherein when the touch panel senses both a first content selection signal and a second content selection signal, contents existing between first content and second content are extracted, and N number of representative contents among the extracted contents are displayed.

The touch screen device may further include a controller displaying contents between the first content and the second content sequentially, when only the first content selection signal is input.

According to an aspect of another exemplary embodiment, there is provided a method of searching for content among contents stored in a touch screen device, the method including: receiving a selection signal for at least one of first content and second content among the stored contents; when the first content and the second content are representative contents, performing a hierarchical level search of the stored contents according to the received selection signal; and when no lower level contents of the first content and the second content exists, performing a sequential level search of the stored contents according to the received selection signal.

BRIEF DESCRIPTION OF THE DRAWINGS

The above and other features and advantages will become more apparent by describing in detail exemplary embodiments thereof with reference to the attached drawings in which.

DETAILED DESCRIPTION OF THE EXEMPLARY EMBODIMENTS

Hereinafter, exemplary embodiments will be described with reference to the accompanying drawings. It is understood that expressions such as "at least one of," when preceding a list of elements, modify the entire list of elements and do not modify the individual elements of the list.

Figure 1:
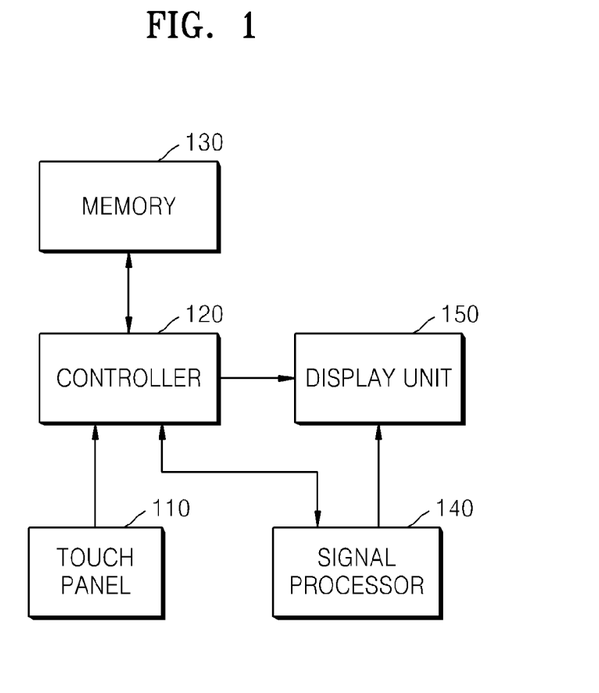
FIG. 1 is a block diagram of a touch screen device having a function of searching for contents, according to an exemplary embodiment.

FIG. 1 is a block diagram of a touch screen device having a content searching function, according to an exemplary embodiment. The touch screen device of FIG. 1 includes a touch panel 110, a controller 120, a memory 130, a signal processor 140, and a display unit 150.

The touch panel 110 may be installed in the display unit 150, or may be separately provided from the display unit 150. When a touch and drag operation occurs, the touch panel 110 detects a corresponding physical quantity, for example, a change in capacitance, to sense the generation of a touch and drag operation, and converts the change in the physical quantity according to the touch and drag operation into a touch signal.

The display unit 150 displays graphic images processed by the signal processor 140, and displays various pieces of status information or controlling commands generated by the controller 120. The display unit 150 may be a liquid crystal display (LCD), though it is understood that another exemplary embodiment is not limited thereto. For example, in another exemplary embodiment, the display unit 150 may be an organic light emitting diode (OLED) display, a plasma display, a light emitting diode-backlit display, etc.

The memory 130 stores the graphic images processed by the signal processor 140, data generated by user manipulation, and contents at hierarchical levels, and stores programs for driving the controller 120 or controlling data. Here, the memory 130 may be a magnetic recording medium such as a hard disk, an electrically erasable programmable read-only memory (EEPROM), or a non-volatile memory such as a flash memory. However, it is understood that another exemplary embodiment is not limited to the above examples.

The signal processor 140 converts contents data generated by the controller 120 into graphic images, and outputs the graphic images to the display unit 150. In addition, the signal processing in the signal processor 140 is executed by hardware (for example, a signal processing circuit) and/or software (for example, signal processing software).

The controller 120 includes a micro processing unit (MPU) or an integrated circuit for performing the controlling operation, and controls overall operations of the touch screen device. In particular, the controller 120 detects the touch, drag and drop operations performed on the touch panel 110. Furthermore, the controller 120 extracts a plurality of representative contents from contents of an entire list and displays the extracted representative contents on the display unit 150, and performs searching operations at a hierarchical level and at a sequential level by using the representative contents displayed on the display unit 150.

Therefore, according to the present exemplary embodiment, a tree-structure display of contents is provided so that both the hierarchical searching operation and the sequential searching operation may be performed by using the representative contents on the touch screen. Thus, a user of the touch screen device may search for the contents rapidly with less inputs required compared to other devices.

Figure 2:
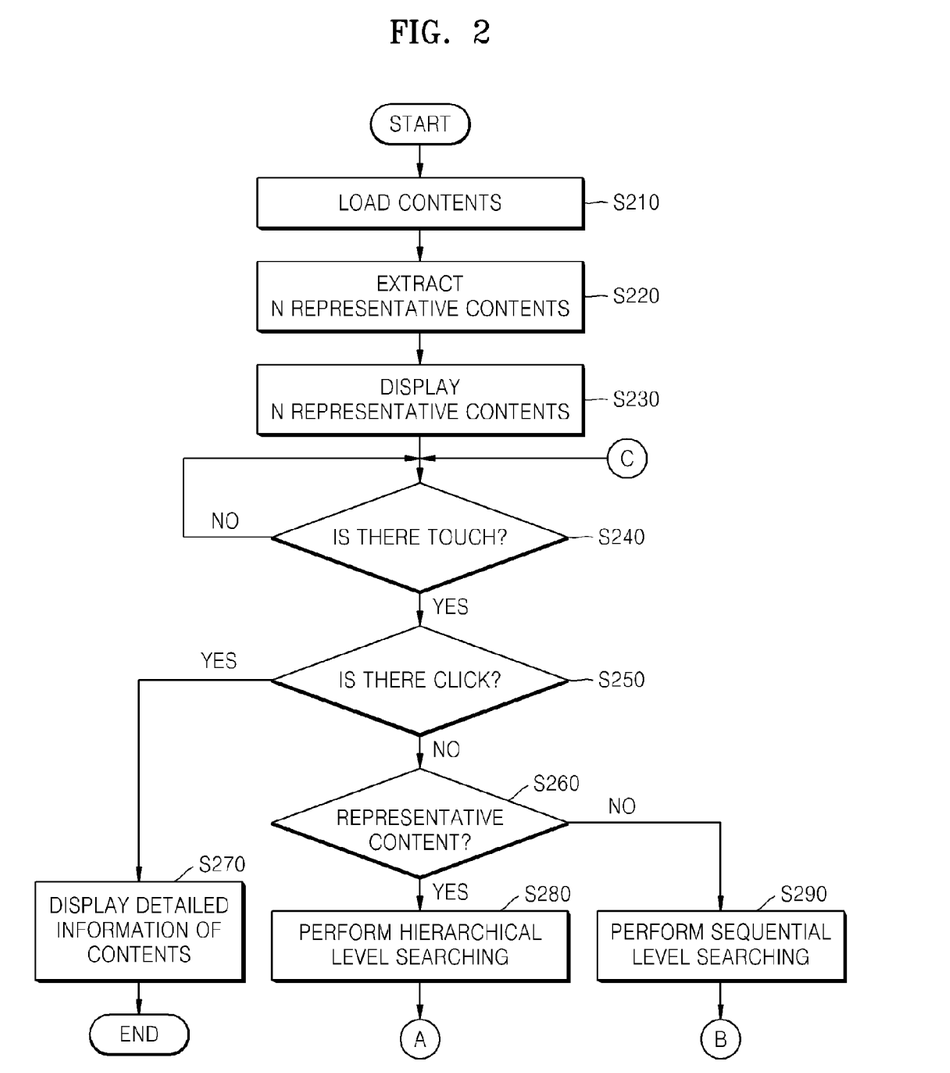
FIG. 2 is a flowchart illustrating processes of searching for contents in a touch screen device according to an exemplary embodiment.

FIG. 2 is a flowchart illustrating a method of searching for contents in a touch screen device, according to an exemplary embodiment. Referring to FIG. 2, when the touch screen device is turned on (ON), contents stored therein are loaded in order to search for contents in operation S210. Here, the contents may be photos, music, messages, phone book, or memos.

Then, N number of representative contents are extracted from the loaded contents in operation S220. Here, N denotes the number of contents that may be displayed on a screen. In addition, the N number of representative contents may be generated by dividing all of the contents stored in the touch screen device by the number of contents that may be displayed on one screen, or may be defined by the user.

Figure 5A:
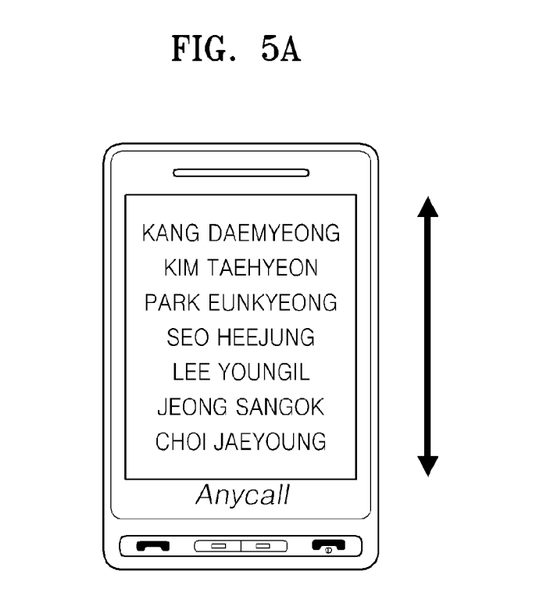
FIGS. 5A through 5D are diagrams showing examples of screens displayed when a contents searching operation is performed according to exemplary embodiments.

The N number of representative contents extracted from among the contents of the touch screen device are displayed on the screen in operation S230. The representative contents are selected by a touching operation, and up/down drag and drop operations. For example, as shown in FIG. 5A, if the number of contents that may be displayed on one screen is seven, seven representative contents from among the contents of the touch screen device are displayed on the screen. There is also a plurality of contents between the representative contents.

In addition, it is checked whether a touch is sensed on the touch panel 110 in operation S240. At this time, when the touch is sensed, it is checked whether the touch is a click operation corresponding to a selection of content, in operation S250. When the touch is sensed as the click operation, detailed information of the corresponding content is displayed on the screen in operation S270.

When the click is not sensed, it is checked whether the contents currently displayed on the screen are the representative contents, in operation S260. Here, the representative contents may be identified by intervals between the contents, which are determined in advance. For example, when the intervals between the displayed contents are greater than "1," the contents displayed on the screen are identified as the representative contents, and when the intervals between the displayed contents are equal to "1," the contents displayed on the screen are identified as sequential level contents.

In addition, if the displayed contents are the representative contents, the hierarchical level searching operation is performed by using the representative contents, in operation S280. That is, the contents of the touch screen device are divided hierarchically, and a searching operation is performed alternately in the upper level of the representative contents and the lower level of the sequential contents. In addition, in a section of the representative content having no lower level, the sequential searching operation is performed by touching the screen.

However, if the displayed contents are not the representative contents, the sequential level searching operation is performed by dragging and dropping on the screen in operation S290.

That is, according to the present exemplary embodiment, an interval of searching for the contents may be adjusted in order to improve an efficiency of the content searching operation and to allow the user to sensitively and intuitively search for the contents.

Figure 3:
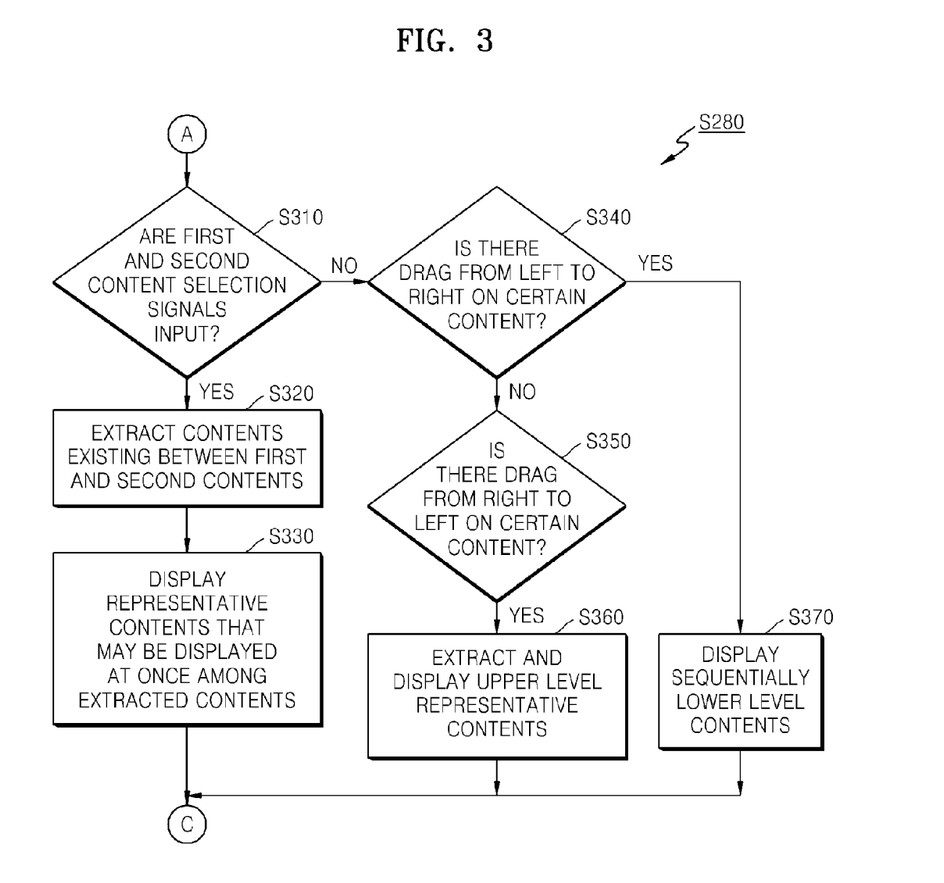
FIG. 3 is a detailed flowchart illustrating processes of performing hierarchical level searching as shown in FIG. 2.

FIG. 3 is a flowchart illustrating processes of performing the hierarchical level searching operation shown in FIG. 2. Referring to FIG. 3, among the representative contents displayed on the screen, it is checked whether selection signals respectively for first representative content and second representative content are input in operation S310. For example, the content selection signal is input through the drag and drop operation on the touch panel 110.

In addition, when the first representative content selection signal and the second representative content selection signal are input, contents existing between the first representative content and the second representative content are extracted in operation S320.

Figure 5B:
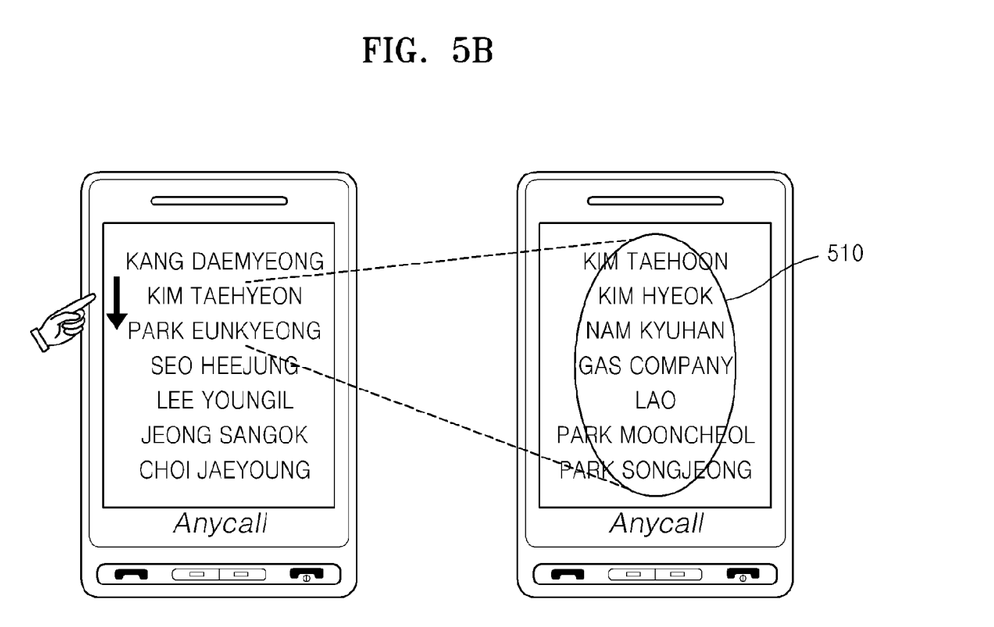

For example, as shown in FIG. 5B, when a drag and drop operation is performed from the first representative content ("kim taehyeon") to the second representative content ("park eunkyeong") among the representative contents displayed on the screen, it is identified that the first representative content and the second representative content are selected.

In addition, at least two or more contents among the extracted contents corresponding to the number of contents that may be displayed on one screen are displayed on the screen in operation S330. For example, if the number of contents that may be displayed on one screen is seven, as shown in FIG. 5B, seven representative contents 510 among the contents existing between the first representative content and the second representative content are displayed on the screen.

In addition, operations S310 to S320 are repeated with respect to two representative contents from among the displayed representative contents 510 to adjust the interval of searching for the contents. That is, the representative contents 510 existing between the first and second representative contents are displayed, and when first and second representative contents are selected again from among the representative contents 510, the representative contents between the first and second representative contents are displayed again. Therefore, the hierarchical content searching operation may be realized by using two representative contents.

Figure 5C:
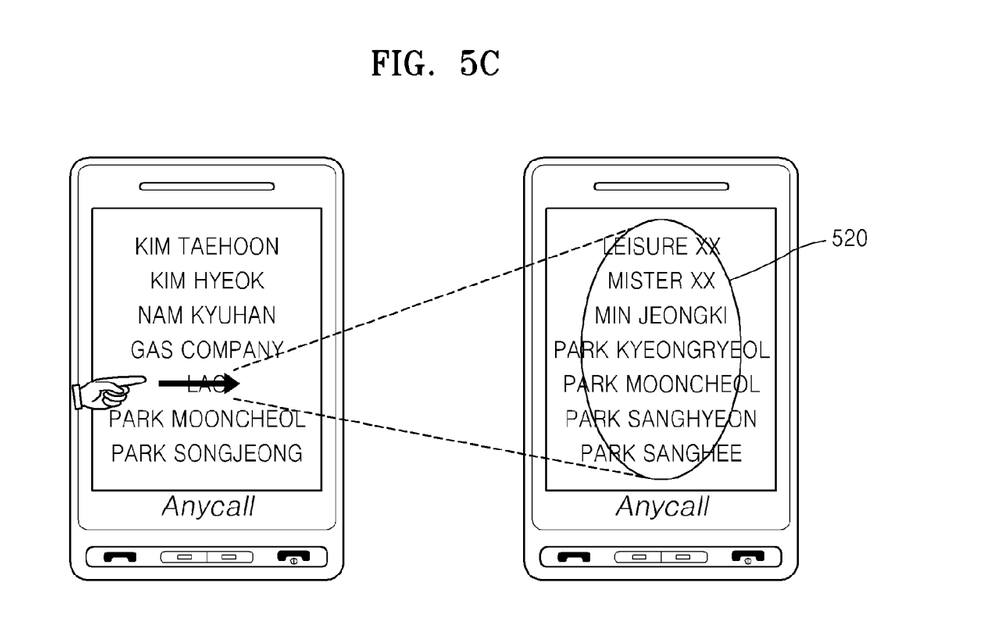

On the other hand, if the first and second representative content selection signals are not input, it is checked whether there is a drag and drop operation from left to right (unidirection) on certain representative content displayed on the screen, in operation S340. For example, as shown in FIG. 5C, when there is a drag operation from the left to right on the representative content "lao" displayed on the screen, it is identified that only the corresponding representative content is selected.

In addition, when a content selection signal corresponding to the drag operation from left to right on a specific representative content is input, contents at the lower level of the selected representative content are sequentially displayed in operation S370. For example, as shown in FIG. 5C, when the drag from left to right is sensed on the displayed representative content "lao," representative contents 520 belonging to the lower level of the representative content "lao" are displayed. Here, the number of representative contents is determined by the number of contents that may be displayed on one screen.

Figure 5D:
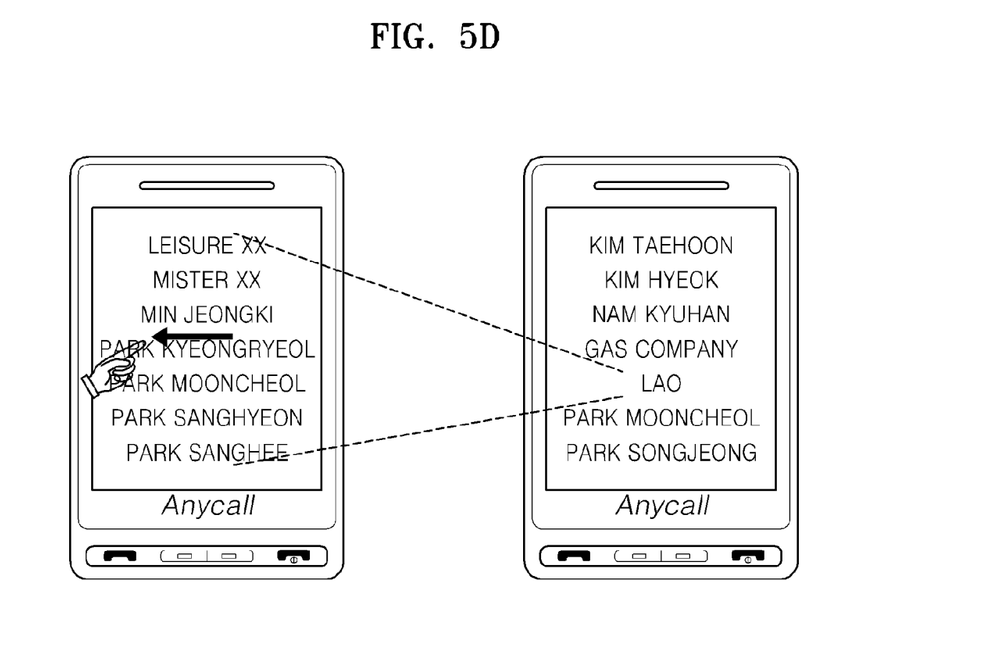

In addition, when a drag from right to left is sensed on a specific representative content in operation S350, upper level contents of the specific representative content are extracted and displayed in operation S360. For example, as shown in FIG. 5D, when the drag from right to left on a specific representative content displayed on the screen is sensed, the upper level representative contents are extracted with reference to history information and displayed on the screen. Here, the number of extracted representative contents is limited to the number of contents that may be displayed on one screen.

Next, if the drag operation in the left-and-right direction is not sensed, the process returns to the touching operation to search for the contents.

That is, according to the present exemplary embodiment, when the content searching operation is performed in the touch screen-based device, the efficiency of the searching operation is improved by adjusting the interval of the searching operation, and at the same time, the user may intuitively and sensitively search for the contents. While left to right and right to left dragging operations are described above to correspond to lower level contents and upper level contents, respectively, it is understood that another exemplary embodiment is not limited thereto. For example, in another exemplary embodiment, the right to left dragging operation may correspond to lower level contents, and the left to right dragging operation may correspond to upper level contents.

Figure 4:
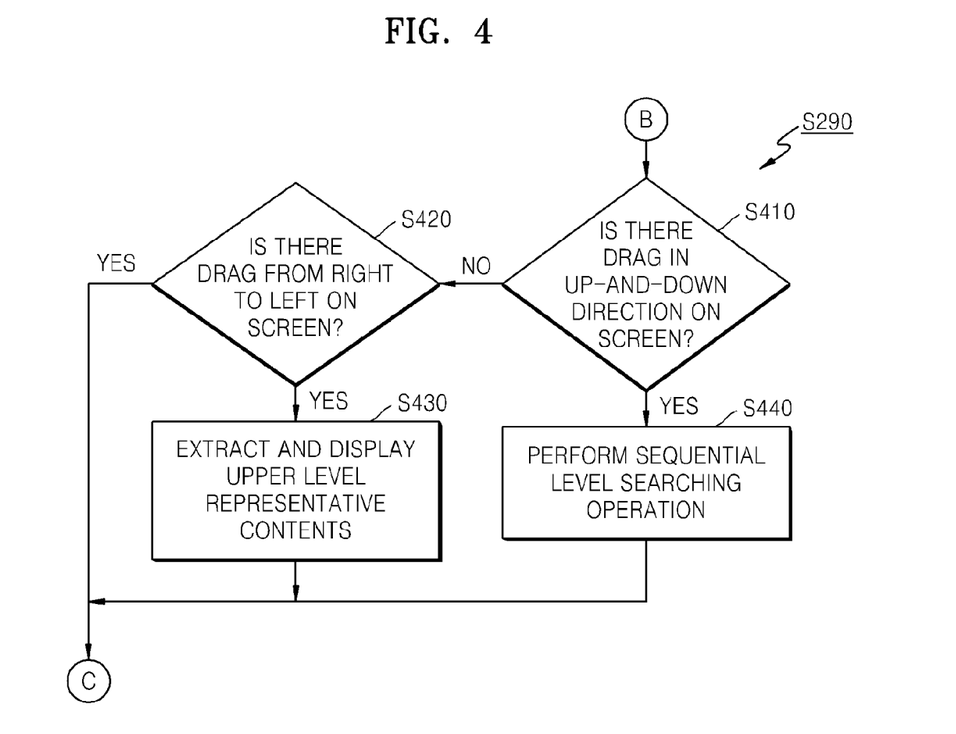
FIG. 4 is a detailed flowchart illustrating processes of performing sequential level searching as shown in FIG. 2.

FIG. 4 is a detailed flowchart illustrating processes of performing the sequential level searching operation of FIG. 2. Referring to FIG. 4, if it is determined that the contents displayed on the screen are not the representative contents, it is identified whether there is a drag operation in an up-and-down direction in the screen of the touch panel in operation S410.

When the drag operation in the up-and-down direction of the screen is sensed, the sequential level searching operation is performed in operation S440.

When the drag operation in the up-and-down direction of the screen is not sensed, it is identified whether there is a drag operation from right to left on the screen in operation S420.

When the drag operation from right to left on the screen is sensed, contents in an upper level of the displayed contents are extracted and displayed in operation S430. For example, as shown in FIG. 5D, when the drag operation from right to left is sensed on the touch panel, the upper level contents of the displayed contents are displayed with reference to history information. It is understood that, in another exemplary embodiment, a drag operation from left to right causes the upper level contents of the displayed contents to be displayed with reference to the history information.

Figure 6:
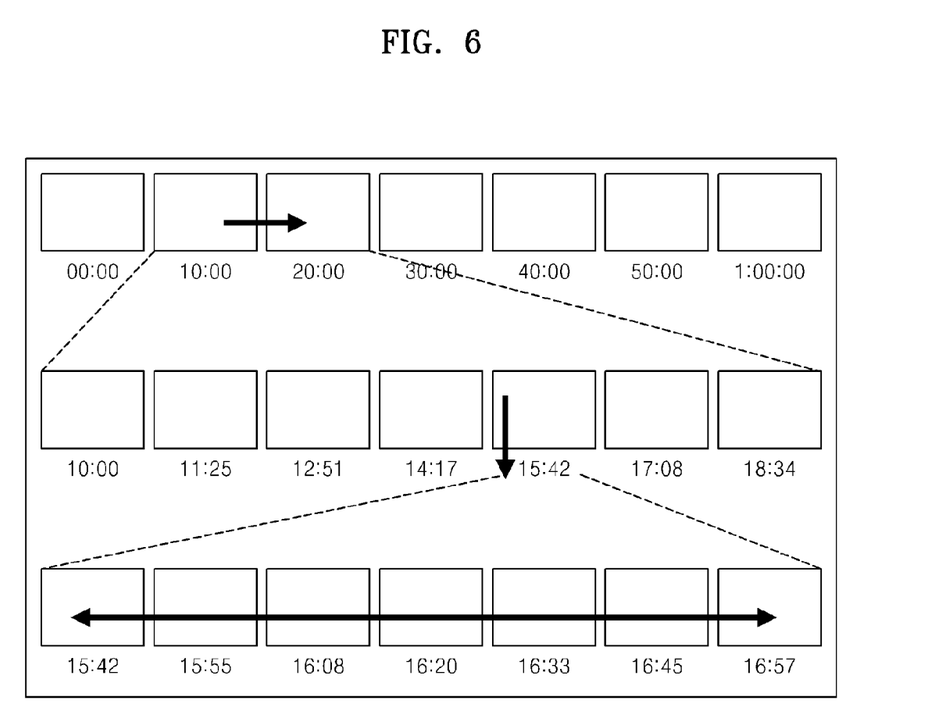
FIG. 6 is a diagram showing an example of a screen displayed when a video contents searching operation is performed in a touch screen device, according to an exemplary embodiment.

FIG. 6 is a diagram showing an example of the screen displayed when video contents are searched in the touch screen device according to an exemplary embodiment. As shown in FIG. 6, when searching for thumb nails of video data, representative image frames are displayed on the screen.

In addition, when two representative images frames (at 10:00 and at 20:00) are selected by the drag operation in the left-and-right direction (denoted by arrows in left/right directions), representative image frames (10:00, 11:25, 12:51, 14:17, 15:42, 17:08, and 18:34) existing between the two selected image frames are displayed on the screen.

In addition, when there is a drag operation in the up-and-down direction (denoted by arrows of up/down directions) on the displayed certain representative frame (15:42), the representative image frames of an upper level of the representative image frame (15:42) are displayed.

It is understood that in other exemplary embodiments, the above-described directions for touch operations may vary in any way to perform the corresponding operations as described above.

While not restricted thereto, the exemplary embodiments can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. Also, the exemplary embodiments may be written as computer programs transmitted over a computer-readable transmission medium, such as a carrier wave, and received and implemented in general-use digital computers that execute the programs.

While the present inventive concept has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of searching for content among contents stored in a touch screen device, the method comprising:
   displaying N number of representative contents among the stored contents;
   selecting at least one of first content and second content from the displayed N number of representative contents;
   when both the first content and the second content are selected, extracting and displaying N number of representative contents existing between the first content and the second content;
   when one of the first content and the second content is selected, sequentially extracting and displaying contents that belong to upper or lower levels of the selected content; and
   adjusting an interval of searching for the contents by repeating the extracting and displaying whenever at least one of the first content and the second content is selected from the displayed N number of representative contents,
   wherein the N number of representative contents are generated into N intervals among the stored contents, and wherein N is the number of contents simultaneously displayable on the touch screen,
   wherein in response to a generated selection signal corresponding to a drag operation in a first direction on a displayed first content section, upper level contents of the first content are displayed; and
   in response to the generated selection signal corresponding to a drag operation in a second direction on the displayed first content section, lower level contents of the first content are displayed.

2. The method of claim 1, wherein the first content and second content are representative contents, respectively.

3. The method of claim 1, wherein the representative contents are identified by intervals between the contents, which are determined in advance.

4. The method of claim 3, wherein the selection signal for only the first content corresponds to a drag operation in a uni-direction on a displayed first content section of the touch screen.

5. The method of claim 1, wherein the selection signal for both the first content and the second content corresponds to a drag and drop operation on the touch screen.

6. The method of claim 1, further comprising displaying upper level contents of the first content or lower level contents of the first content according to a sensed direction of a drag operation performed on a displayed first content section of the touch screen.

7. The method of claim 6, wherein the displaying the upper level contents or the lower level contents comprises, in response to sensing the drag operation from right to left on the displayed first content section of the touch screen, displaying the upper level contents of the first content with reference to history information.

8. The method of claim 6, wherein the displaying the upper level contents or the lower level contents comprises, in response to sensing the drag operation from left to right on the displayed first content section of the touch screen, sequentially displaying lower level contents of the first content.

9. The method of claim 6, wherein when no lower level content of the first content exists, a first content section of the touch screen is sequentially searched by a touching operation.

10. The method of claim 1, further comprising displaying upper level representative contents of displayed contents with reference to history information, in response to sensing a drag operation from left to right on any section of the touch screen.

11. The method of claim 1, further comprising, when no lower level content of the first content exists, performing a sequential level searching operation or displaying upper level representative contents of displayed contents according to a sensed direction of a drag operation on the touch screen.

12. A touch screen device comprising:
    a display unit which displays N number of representative contents among stored contents;
    a touch panel which senses at least one of a touch operation and a drag operation for selecting at least one of first content and second content from the displayed N number of representative contents; and
    a controller which, when both the first content and the second content are selected, extracts N number of representative contents existing between the first content and the second content and controls the display unit to display the N number of representative contents existing between the first content and the second content, when one of the first content and the second content is selected, sequentially extracting and displaying contents that belong to upper or lower levels of the selected content, and adjusting an interval of searching for the contents by repeating the extracting and displaying whenever at least one of the first content and the second content is selected from the displayed N number of representative contents,
    wherein the N number of representative contents are generated into N intervals among the stored contents by the number of contents simultaneously displayable on the touch screen,
    in response to a generated selection signal corresponding to a drag operation in a first direction on a displayed first content section, the controller controls the display unit to display upper level contents of the first content; and
    in response to the generated selection signal corresponding to a drag operation in a second direction on the displayed first content section, the controller controls the display unit to display lower level contents of the first content.

13. The touch screen device of claim 12, wherein the representative contents are identified by intervals between the contents, which are determined in advance.

14. The touch screen device of claim 12, wherein if no lower level content of the first content exists:
    the controller performs a sequential level searching operation in response to the generated selection signal corresponding to a drag operation in a first direction on the display unit; and
    the controller controls the display unit to display upper level representative contents of the displayed contents in response to the generated selection signal corresponding to a drag operation in a second direction on the display unit.

15. A non-transitory computer readable recording medium having embodied thereon a program for executing the method of claim 1.

* * * * *